United States Patent [19]
Garnett

[11] Patent Number: 5,911,778
[45] Date of Patent: Jun. 15, 1999

[54] PROCESSING SYSTEM SECURITY

[75] Inventor: Paul Jeffrey Garnett, Merseyside, United Kingdom

[73] Assignee: Sun Microsystems, Inc., Mountain View, Calif.

[21] Appl. No.: 08/777,256

[22] Filed: Dec. 31, 1996

[51] Int. Cl.[6] ................................................. G06F 12/14
[52] U.S. Cl. .................... 713/200; 713/201; 395/200.79; 340/825.31; 340/825.32; 340/825.34
[58] Field of Search ............................... 395/186, 200.79; 326/38; 340/825.34, 825.31, 825.32; 380/25; 711/164

[56] References Cited

U.S. PATENT DOCUMENTS

| | | | |
|---|---|---|---|
| 5,018,096 | 5/1991 | Aoyama | 711/164 |
| 5,297,200 | 3/1994 | Murray | 340/825.34 |
| 5,355,414 | 10/1994 | Hale | 380/25 |
| 5,434,562 | 7/1995 | Reardon | 340/825.34 |
| 5,483,649 | 1/1996 | Kuznetsov et al. | 395/186 |
| 5,535,409 | 7/1996 | Larvoire et al. . | |
| 5,557,742 | 9/1996 | Smaha | 395/186 |
| 5,640,107 | 6/1997 | Kruse | 326/38 |
| 5,742,760 | 4/1998 | Picazo, Jr. et al. | 395/200.79 |

FOREIGN PATENT DOCUMENTS

| | | |
|---|---|---|
| 0 660 215 A3 | 11/1994 | European Pat. Off. . |
| 660215 A2 / A3 | 11/1994 | European Pat. Off. . |
| 27 33 531 | 2/1979 | Germany . |

*Primary Examiner*—Parshotam S. Lall
*Assistant Examiner*—Philip B. Tran
*Attorney, Agent, or Firm*—Blakely Sokoloff Taylor & Zafman

[57] ABSTRACT

For controlling access to a system resource in a processing system, reprogrammable logic located between a bus and the resource is programmed in a first mode to permit access to the resource and is programmed in a second mode to at least restrict access to said resource via the bus. The resource can be a critical area of storage holding or identifying critical operational parameters or critical operational software relating to the processing system. The reprogrammable logic is preferably implemented using a field programmable gate array.

16 Claims, 3 Drawing Sheets

PROCESSING SYSTEM SECURITY

BACKGROUND OF THE INVENTION

1. Field of the Invention

This invention relates to computer system security, and in particular to the protection of a critical resource within a processing system.

2. Description of Related Art

A computer system may be stopped from working by a software bug, or by a malicious act interfering with a critical system resource. The system resource can be a hardware resource, or can be software or data stored or otherwise retained within the computing system.

SUMMARY OF THE INVENTION

An object of the invention is to improve the security of a system by preventing, or making more difficult, access to a critical resource.

In accordance with a first aspect of the invention, there is provided a method of controlling access to a system resource in a processing system including a processing engine, said system resource and a bus, said method comprising steps of: in a first mode programming reprogrammable logic located between said bus and said resource to permit access by said processing engine via said bus to said resource; and in a second mode programming said reprogrammable logic to at least restrict access to said resource via said bus.

By reprogramming the reprogrammable logic to restrict access to the critical resource, accidental or deliberate corruption of the critical resource can be prevented or at least made more difficult, thus improving overall system security and integrity.

The resource can be a critical hardware component, although it will typically be an area of storage containing or identifying critical operational software or critical operational parameters of the system. The programming of the reprogrammable logic in the second mode can thus be used to block access selectively or totally to the storage area.

The storage area can comprise test software and/or test parameters relating to the processing system.

Preferably the reprogrammable logic comprises a field programmable gate array. First programming information and second programming information can both be stored in memory in the processing system. Alternatively the first programming information is supplied externally to the processing system when required, and is not otherwise stored in the processing system. The latter alternative provides higher security and may be particularly useful for test purposes, whereby a test engineer could supply the first programming information in a test mode of operation.

In accordance with a further aspect of the invention, there is provided a processing system (for example a computer system) comprising a processing engine (for example a microprocessor or microcontroller), a system resource, a bus and reprogrammable logic located between said bus and said resource, said reprogrammable logic being programmable in a first mode to permit access by said processing engine via said bus to said resource and being programmable in a second mode to at least restrict access to said resource via said bus.

BRIEF DESCRIPTION OF THE DRAWINGS

Particular embodiments of the invention will be described hereinafter with reference to the accompanying drawings in which.

DETAILED DESCRIPTION OF THE INVENTION

Figure 1:
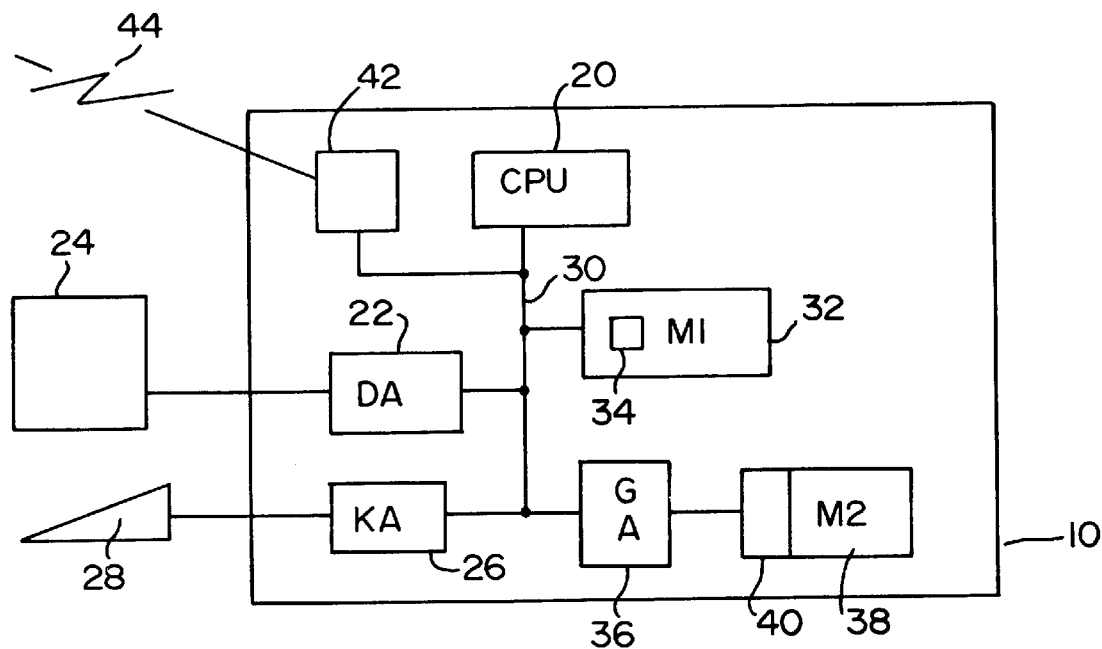
FIG. 1 is a schematic overview of a computing system.

FIG. 1 is a schematic overview of a computing system 10. The computing system comprises a processor 20 connected via a bus 30 to a number of resources. A display adapter 22 enables a display 24 to be connected to the bus 30. Similarly, a keyboard adapter 26 allows a keyboard 28 to be connected to the bus 30. A first memory Ma 32 is connected directly to the bus 30. A further memory M2 38 containing a critical software resource 40 is connected to the bus 30 via reprogrammable logic, for example a reprogrammable gate array 36. A communications adapter 42 enables an external communications line 44 to be connected to the computer bus 30.

It will be appreciated that FIG. 1 is merely a schematic overview of a computing system, and that an alternative computing system could have a different structure from that shown in FIG. 1. In the example of FIG. 1, and also in the examples set out hereinafter, the critical resource is assumed to be data, or software, stored in the memory M2 38. However, in other embodiments of the invention the critical resource could be a hardware component which is, for example, reconfigurable. An example of such a component could be a clock signal generator having a selectable clock rate. Alternatively, the hardware component could be a component of a system which is used only during certain modes of operation of the system. It may be desirable to prevent access to the hardware component by the user of the apparatus, permitting access only during a test or repair mode under the control of a service engineer.

In a preferred embodiment of the invention, the reprogrammable logic 36 is a reprogrammable gate array, such as a field programmable gate array (FPGA). In the following embodiments reference will be made to an FPGA 36, although other implementations of the device for restricting access to the resource may be provided.

Figure 7:
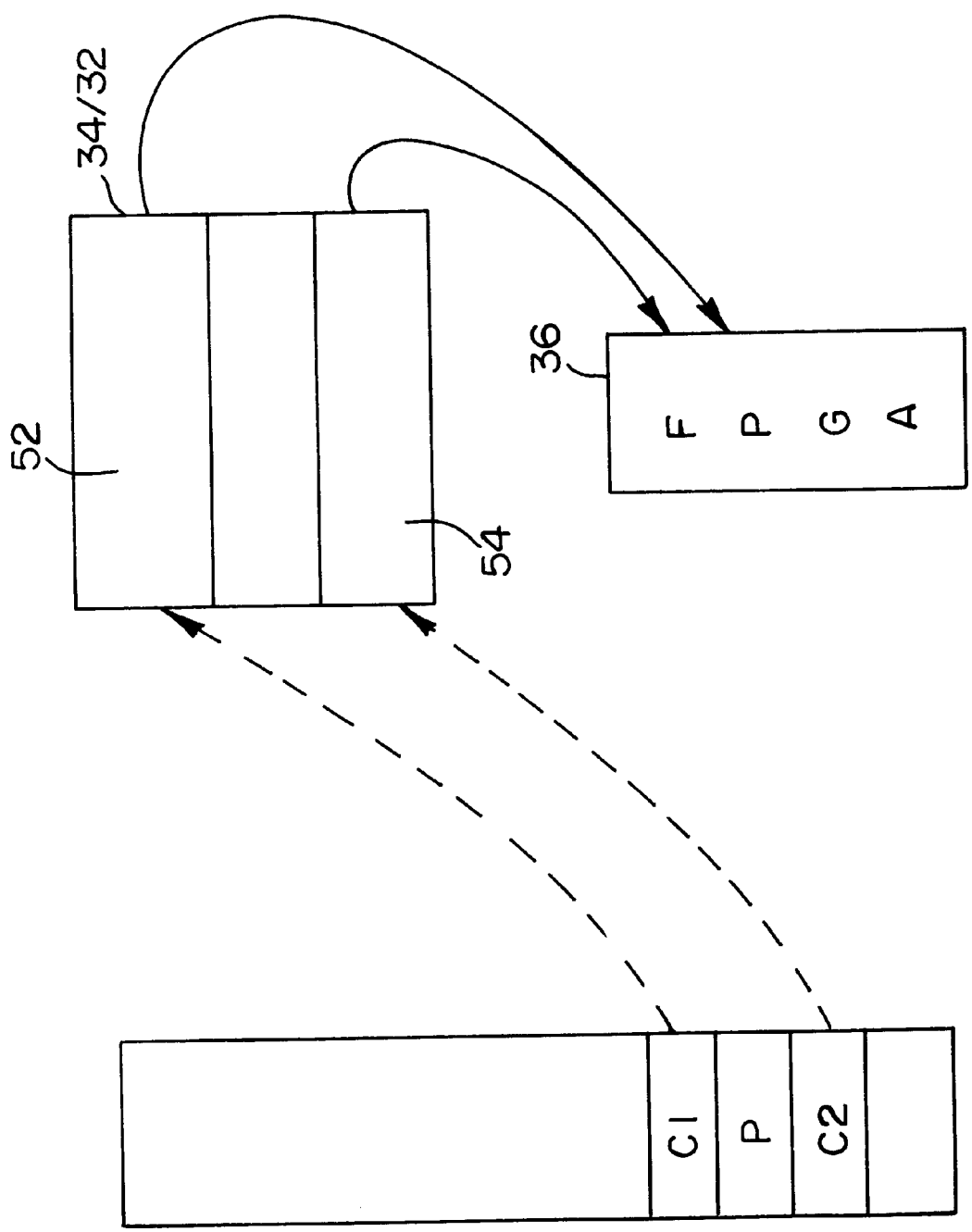
FIG. 7 is a schematic diagram illustrating the operation of the invention.

FIG. 7 illustrates an initial stage of operation of an embodiment of the invention such as that described in FIG. 1. In particular, on initially booting the computing system, initialization code 50 is operable to carry out the initialization of the system. At a point in the initialization program, reference C1 is made to first code stored at locations 52 in the memory M1 32. This information is loaded from the memory 32 (which could, for example, be a read only memory) into the FPGA 36 to initially program the FPGA 36. The FPGA 36 is then responsive to signals provided over the computer bus 30 to provide a first mode for enabling access by programming code P to the critical resource 40 in the memory M2 to perform the appropriate initialization functions. After execution of the code P, a second reference C2 to information stored at 54 in the memory 32 is made. This second information 54 is then loaded into the FPGA 36 overwriting the original programming of the FPGA 36. This reprogramming of the FPGA 36 can then prevent, or restrict further access to the critical resource 40 in a second mode.

Any one of many different models of commercially available reprogrammable can be employed as the FPGA 36 in an embodiment of the invention. The programming of the FPGA 36 will depend on the particular reprogrammable FPGA used and should be in accordance with the technical design specification for the FPGA concerned, as will be apparent to one skilled in the art.

Figure 2:
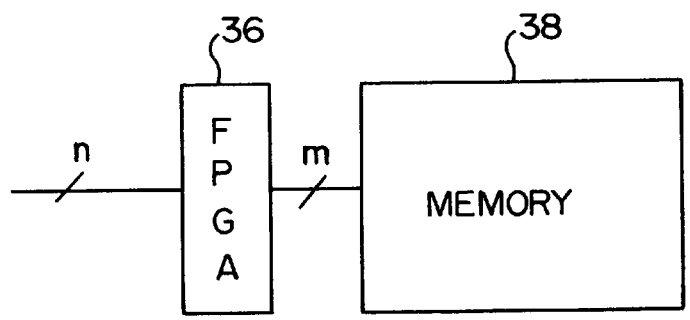
FIG. 2 is a schematic overview of one implementation of the present invention.

FIG. 2 is a schematic representation of one configuration of an FPGA 36 and a memory 38, the FPGA receiving an N bit bus, and being connected to the memory 38 by an M bit bus.

Figure 3:
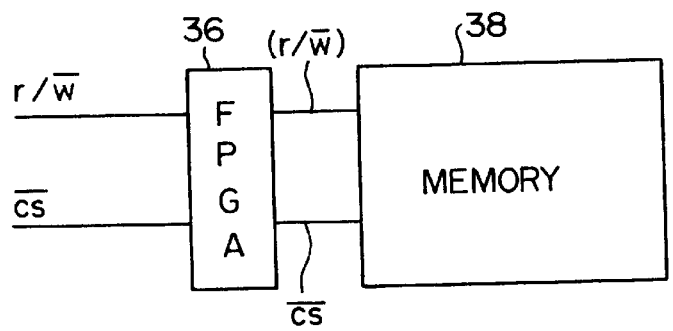
FIGS. 3–6 relate to further examples of implementations of the present invention.

FIG. 3 represents one specific embodiment of the invention with an FPGA receiving a read/write line r/w and a chip select line at cs and supplying the chip select and read/write lines to the memory 38. In this embodiment, the FPGA can be initially programmed to pass read and write signals, as well as the chip select signals to the memory 38. With the second programming (reprogramming) the FPGA can be arranged to pass only read signals, thus preventing writing to the memory 38. Alternatively, both read and write signals to the memory 38 could be prevented with the second programming. In either case system resource protection is provided either by preventing overwriting by the user or by completely blocking access to the memory 38.

Figure 4:
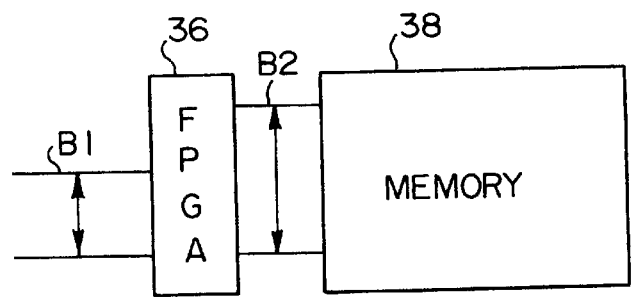
Figure 5:
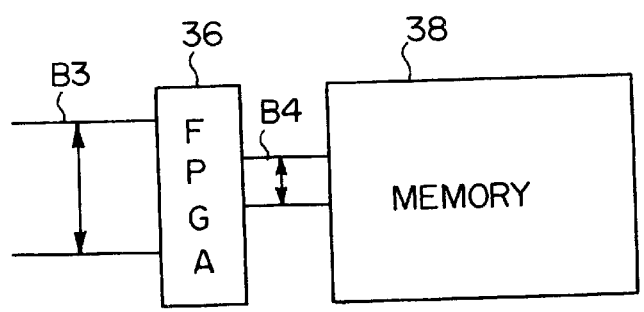

FIGS. 4 and 5 indicate that the FPGA 36 can provide a translation between different sized buses. Thus, in FIG. 4, a narrow bus B1 accesses the FPGA 36 but the FPGA 36 decodes the signals on the input bus B1 to provide individual decoded lines B2 for accessing the memory 38.

In FIG. 5, a wide bus B3 accesses the FPGA 36, which only passes selected bits B4 of the address to the memory 38. In an embodiment of the invention, the FPGA provides a different translation in the first and second programming modes.

Figure 6:
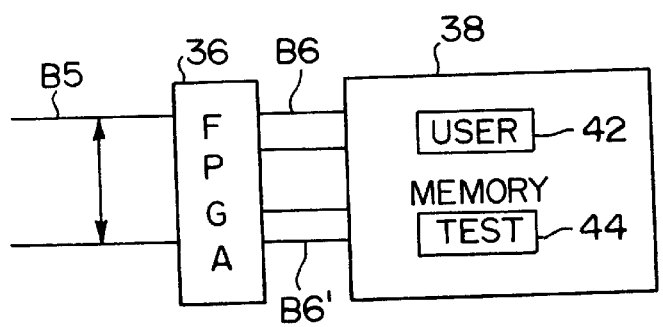

FIG. 6 illustrates an arrangement where a bus B5 is provided at the input side of the FPGA 36. At the output side of FPGA, address lines represented at B6 and further address lines represented at B6' are provided. In an embodiment of the invention the address lines B6 provide address signals with both the first and second programming of the PFGA, whereas the address signals on lines B6' are either blocked or altered with either the first or second programming of the FPGA, whereby with the first programming, access to test software 44 within the memory 38 can be permitted, whereas with the second programming, access to the test programming is prevented and access is instead permitted to user software 42. It would then be possible, during initial design and testing, or during subsequent use for diagnostic purposes, for a test engineer to reprogram the FPGA with the original, first programming, and thereby permit access once more to the test software 44.

As illustrated schematically in FIG. 1, the information 52, 54 is provided in the memory area 34 of memory 32. However, it may be that the information relating to the first programming of the FPGA may not be retained in the memory of the computer system 10 at all, but could instead be provided externally by a test engineer when testing of the system is required. In this way, it would not be possible for the user to seek out and possibly find the information required for programming the FPGA.

To provide additional security, it would be possible to encrypt the data stored in the areas 52/54 to make it more difficult for a user to find the information necessary for programming the FPGA 36.

An embodiment of the invention can provide security of operation in that accidental access to critical resources can be prevented during normal use. Also, an embodiment of the invention can make it significantly more difficult for the user to access the critical resources.

Although particular embodiments of the inventions have been described, it will be appreciated that the invention is not limited thereto, and many modifications and/or additions may be made within the spirit and scope of the invention as defined in the appended Claims. For example, different combinations of the features of the dependent Claims may be combined with the features of the independent Claims.

Also, by way of further example, although in the embodiment described herein, the processing system is shown as a computer system, the processing system could be any apparatus or system having a computer-based, microprocessor-based or microcontroller-based control system.

What is claimed is:

1. A method of controlling access to a system resource in a processing system including a processing engine, said method comprising steps of:

in a first mode, programming reprogrammable logic located between a first bus and a second bus to permit access by said processing engine via said first and second busses to said resource by providing a first translation between said first and second busses; and a second mode, programming said reprogrammable logic to provide a second translation to at least restrict access to said resource via said first and second busses.

2. A method according to claim 1, wherein said resource is a critical area of storage, said second programming of said reprogrammable logic blocking access to said storage area.

3. A method according to claim 2, wherein said storage area comprises critical operational parameters relating to said processing system.

4. A method according to claim 2, wherein said storage area identifies or comprises critical operational software.

5. A method according to claim 2, wherein said storage area comprises test software and/or test parameters relating to said processing system.

6. A method according to claim 1, wherein said reprogrammable logic comprises a reprogrammable field programmable gate array.

7. A method according to claim 6, wherein first programming information and second programming information are stored in memory in said processing system.

8. A method according to claim 1, wherein said first programming information is supplied externally to said processing system when required, and is not otherwise stored in said processing system.

9. A processing system comprising a processing engine, a system resource, and reprogrammable logic located between a first bus and a second bus, said reprogrammable logic being programmable in a first mode to permit access by said processing engine to said resource by providing a first translation between said first and second busses and being programmable in a second mode to at least restrict access to said resource via said said first and second busses by providing a second translation.

10. A system according to claim 9, wherein said critical resource is an area of storage, said reprogrammable logic, when programmed in said second mode, blocking access to said storage area.

11. A system according to claim 10, wherein said storage area comprises critical operational parameters relating to said processing system.

12. A system according to claim 10, wherein said storage area identifies or comprises critical operational software.

13. A system according to claim 10, wherein said storage area comprises test software and/or test parameters relating to said processing system.

14. A system according to claim 9, wherein said reprogrammable logic comprises a reprogrammable field programmable gate array.

15. A system according to claim 14, wherein first programming information and second programming information are stored in memory in said processing system.

16. A system according to claim 9, wherein said first programming information is supplied externally to said processing system when required, and is not otherwise stored in said processing system.

\* \* \* \* \*